United States Patent
Chang et al.

(10) Patent No.: US 7,498,792 B2
(45) Date of Patent: Mar. 3, 2009

(54) PULSE MODULATION SYSTEM WITH NONLINEAR RAMP

(75) Inventors: Tsai-Fu Chang, Taichung (TW); Liang-Pin Tai, Tainan (TW)

(73) Assignee: Richtek Technology Coporation, Hsinchu (TW)

( * ) Notice: Subject to any disclaimer, the term of this patent is extended or adjusted under 35 U.S.C. 154(b) by 168 days.

(21) Appl. No.: 11/269,798

(22) Filed: Nov. 9, 2005

(65) Prior Publication Data
US 2006/0273769 A1 Dec. 7, 2006

(30) Foreign Application Priority Data
Jun. 3, 2005 (TW) .............................. 94118348 A (51) Int. Cl.
*G05F 1/00* (2006.01)
(52) U.S. Cl. .................... 323/288; 323/326; 323/282
(58) Field of Classification Search ................ 323/326, 323/242, 241, 266, 280, 288, 282
See application file for complete search history.

(56) References Cited
U.S. PATENT DOCUMENTS

| | | | |
|---|---|---|---|
| 6,049,473 A * | 4/2000 | Jang et al. ..................... | 363/89 |
| 6,335,953 B1 * | 1/2002 | Sanderford et al. ......... | 375/344 |
| 6,420,861 B2 * | 7/2002 | Ochi et al. ................... | 323/288 |
| 2003/0001683 A1 * | 1/2003 | Kawajiri et al. ............. | 331/100 |
| 2004/0072597 A1 * | 4/2004 | Epperson et al. ............ | 455/572 |
| 2004/0135567 A1 * | 7/2004 | Fukui .......................... | 323/288 |
| 2004/0178777 A1 * | 9/2004 | Bayadroun .................. | 323/274 |
| 2006/0001488 A1 * | 1/2006 | Ryoo et al. .................. | 330/251 |

* cited by examiner

*Primary Examiner*—Matthew V Nguyen
*Assistant Examiner*—Nguyen Tran
(74) *Attorney, Agent, or Firm*—Stout, Uxa, Buyan & Mullins, LLP (57) ABSTRACT

A pulse-width-modulation (PWM) control system with non-linear ramp is disclosed. A nonlinear ramp generator generates a nonlinear ramp varied with the duty ($V_{out}/V_{in}$) in a waveform signal, which could be a logarithm ramp, an exponent ramp, a multi-piecewise-linear ramp, a power ramp or a combination of above. The slope of the ramp is not a constant due to the non-linear characteristic. The voltage $V_{ramp}$ will vary with the input voltage $V_{in}$, output voltage $V_{out}$, and duty ($V_{out}/V_{in}$), therefore it will reduce the influence of the input voltage $V_{in}$ or output voltage Vout on the modulation gain and loop gain, even to keep the modulation gain and loop gain in constant value. As mentioned-above, the present invention improves the transient response of system, the sensitivity for variation of $V_{in}$ and $V_{out}$, thus it is capable of correcting the output voltage quickly, for supplying a more steady power output.

28 Claims, 6 Drawing Sheets

PULSE MODULATION SYSTEM WITH NONLINEAR RAMP

FIELD OF THE INVENTION

The present invention relates generally to a pulse-width-modulation control system with a ramp, and more specifically, to a pulse-width-modulation control system with a nonlinear ramp, which is a function of duty.

DESCRIPTION OF THE PRIOR ART

Figure 1:
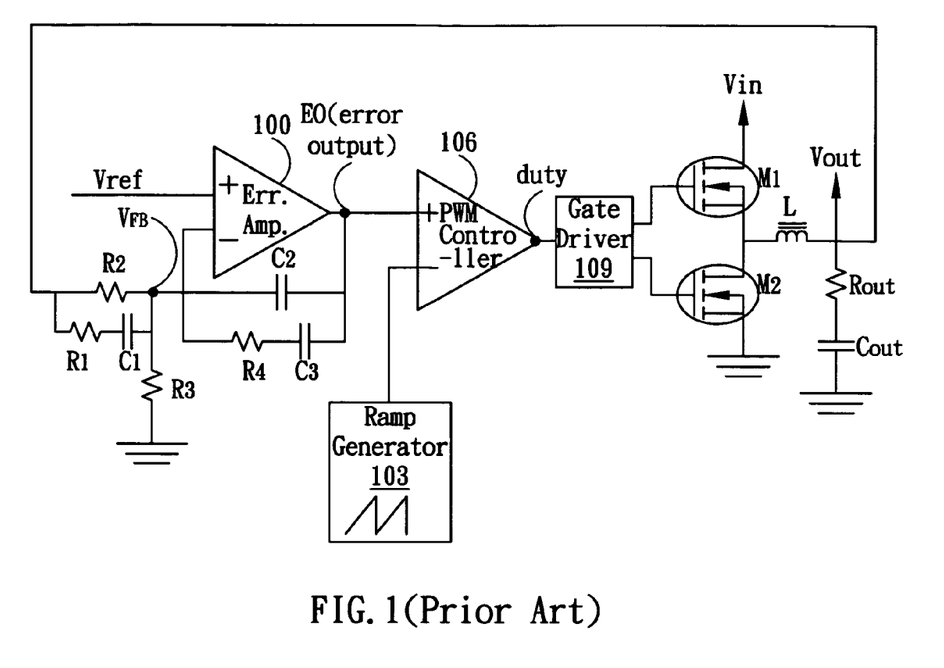
FIG. 1 is a circuit diagram of conventional PWM control system.

FIG. 1 illustrates a traditional PWM (Pulse Width Modulation) control system. A ramp voltage provided by a ramp generator 103, usually a triangular or sawtooth waveform signal, is used to compare with an error output amplified by an error amplifier 100. The comparison is done via a PWM controller 106, and thus a duty signal is generated to control a gate driver 109.

The gate driver 109 switch to control two transistors $M_1$ and $M_2$ being either on or off, thus a input voltage $V_{in}$ could storage or release energy via an induction L and a capacitor $C_{out}$ and transfer to an output voltage $V_{out}$ according to the equation: $V_{out}=duty*V_{in}$. The output voltage $V_{out}$ is electrically connected to two resistors $R_1$ and $R_2$ then connecting to the negative terminal of the error amplifier 100 as a feedback voltage. In additional, a reference voltage $V_{ref}$ is connected to the positive terminal of the error amplifier 100. The output voltage $V_{out}$ is adjusted each cycle to achieve constant value by comparing the reference voltage $V_{ref}$ to the feedback voltage via the error amplifier 100 to generate an error output, and comparing the error output to the ramp voltage via the PWM controller 106 to obtain a reset signal for the gate driver 109. The loop gain of the single cycle PWM control system is the feedback factor multiplied by the gain of the error amplifier 100 and multiplied by the modulation gain of the PWM controller 106, where the feedback factor depend on the resisters $R_1$, $R_2$, $R_3$, $R_4$ and capacitors $C_1$, $C_2$, $C_3$, $C_4$, and where the modulation gain of the PWM controller 109 equals $V_{in}/V_{ramp}$. The $V_{ramp}$ has a constant slope, thus a variation of the input voltage $V_{in}$ will cause varying the modulation gain of the PWM controller 109 and hence cause varying the loop gain of the single cycle PWM control system.

Figure 2:
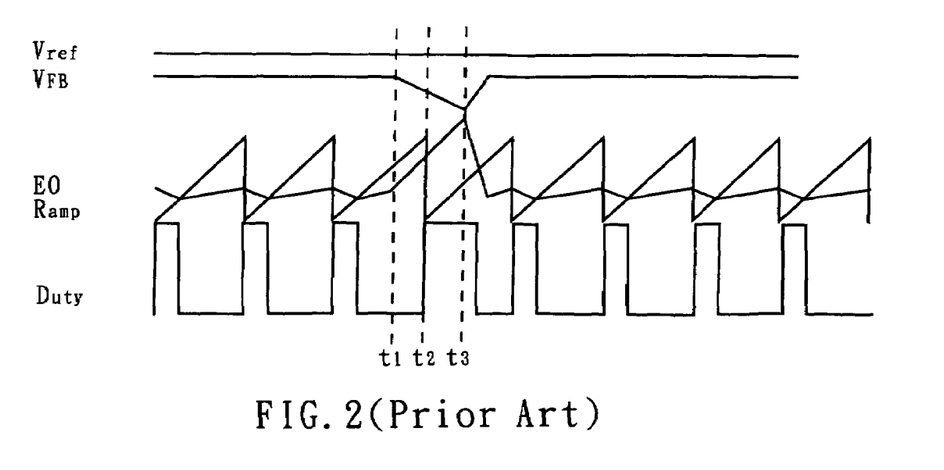
FIG. 2 is a time vs. performance diagram based on the conventional PWM control system.

FIG. 2 is a time vs. performance curve based on the structure shown in FIG. 1. The x-axis represents the time, and the reference voltage $V_{ref}$, the ramp voltage generated by the ramp generator 103 and the duty signal generated by the PWM controller show their responses if the feedback voltage is suddenly dropping due to a variation of the input voltage $V_{in}$ or a great quantity loading of the output voltage $V_{out}$ being encountered. At time $t_1$, the dropping of the input voltage or the output voltage causes the dropping of the feedback voltage since they are electrically connected through the resistors $R_1$, $R_2$ (see FIG. 1), and the error output is rising in the meanwhile due to the deviation departing from the target i.e. the reference voltage $V_{ref}$ being getting large. The PWM controller 106 control works by switching the duty signal supplied to the gate driver 109 on and off very rapidly. The DC voltage is converted to a square-wave signal, alternating fully on while the error output is higher than the ramp voltage, and alternating fully zero while the error output is lower than the ramp voltage. At time $t_2$, the error output is large enough to switch the duty signal fully on, to switch the transistor $M_1$ (see FIG. 1) on and to switch the transistor $M_2$ off via the gate driver 109, hence the output voltage is corrected via the inductor L and capacitor $C_{out}$. After that, the deviation between the reference voltage $V_{ref}$ and the output voltage $V_{out}$ is beginning to close. At time $t_3$, the output voltage $V_{out}$ is high enough closing to the reference voltage, thus the feedback voltage is beginning to rise to the steady value.

The correction of the PWM control system for the dropping of the feedback voltage is a transient response. In general, it is too slow to adjust the output voltage in time, thus its voltage value may be too low to supply a voltage sufficiently to the circuits that it is connected, consequently causing the erroneous activity. In addition, the modulation gain of the PWM controller varies with the input voltage $V_{in}$ easily. It is necessary to reset and estimate the loop stability while a power supply is replaced. And if the input voltage is too high or the duty signal is too low, the gain of the PWM controller is too high to back the feedback voltage to the steady state.

Therefore, it would be an advantageous to have a novel PWM control system that allow for correcting the deviation quickly, keeping the loop more stable and estimating the stability conveniently.

SUMMARY OF THE INVENTION

It is therefore a general object of the present invention to provide a novel PWM control system with a better transient response.

A further object of the present invention is to keep the loop more stable and to estimate the loop stability conveniently.

According to the objects, the present invention provides a novel PWM control system that includes a nonlinear ramp generator to generate a nonlinear ramp, which is a waveform signal and varied with the duty, and it could be a log ramp, a exponential ramp, a multi-piecewise-linear ramp, a power ramp etc . . . . The slope of the ramp is not a constant due to the non-linear characteristic. The voltage Vramp will vary with the input voltage Vin, output voltage Vout, and duty (Vout/Vin), therefore it will reduce the influence of the input voltage Vin or output voltage Vout on the modulation gain and loop gain, even to keep the modulation gain and loop gain in constant value. As mentioned-above, the present invention improves the transient response of system, the sensitivity for variation of Vin and Vout, thus it is capable of correcting the output voltage quickly, for supplying a more steady power output.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 3:
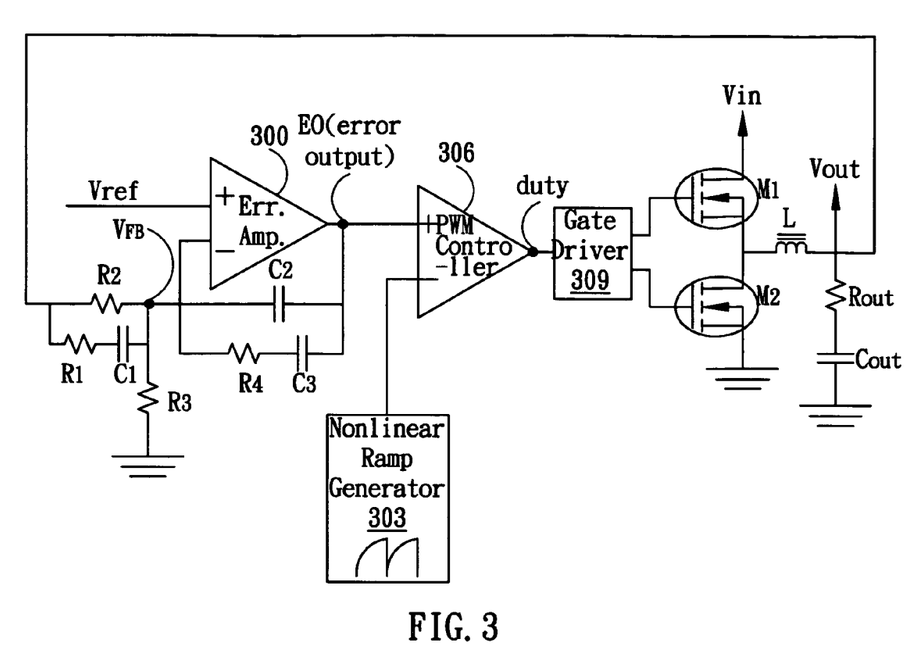
FIG. 3 is a circuit diagram of one embodiment according to present invention.

FIG. 3 shows a PWM control system according to present invention. The difference between FIG. 1 and FIG. 3 is a nonlinear ramp generator 303 (see FIG. 3) replaces the ramp generator 103 shown in FIG. 1. In FIG. 1, the ramp generator 103 generates a triangular waveform signal or a sawtooth waveform signal with a constant slope. In FIG. 3, the nonlinear ramp generator 303 generates a nonlinear ramp signal with variable slopes such as log ramp, exponential ramp, multi-piecewise-linear ramp, power ramp etc.

Figure 4:
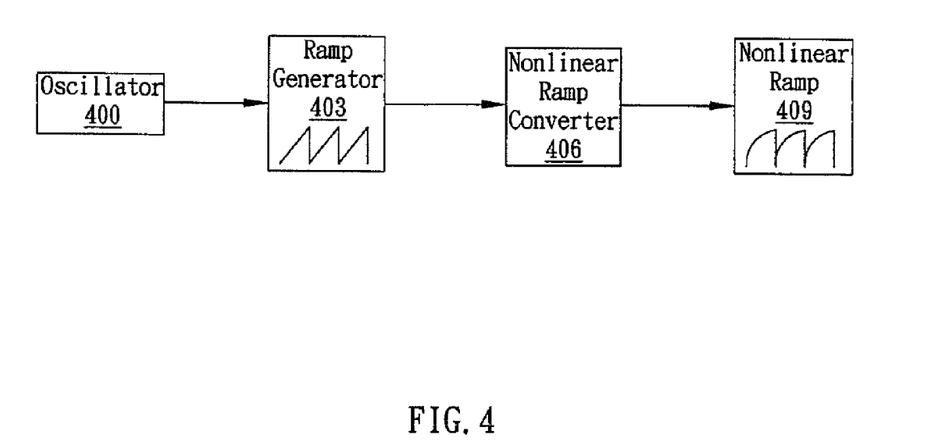
FIG. 4 is a block diagram of the nonlinear ramp generator of one embodiment according to present invention.
Figure 5:
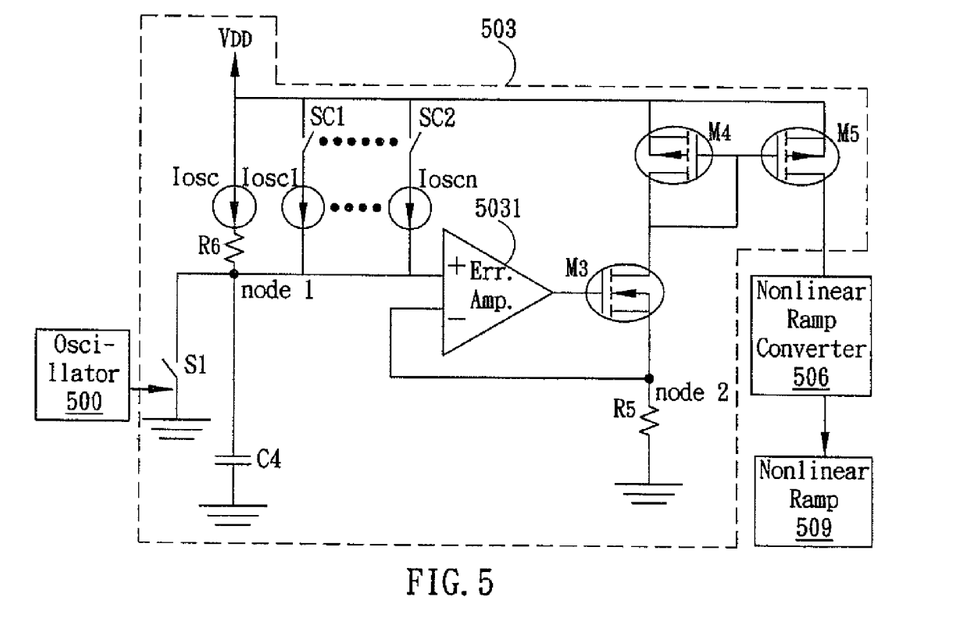
FIG. 5 is a block diagram of nonlinear ramp generator as well as a circuit diagram of ramp generator of one embodiment according to present invention.

FIG. 4 shows a block diagram of the nonlinear ramp controller 303 of the PWM control system shown in FIG. 3. The nonlinear ramp generator includes an oscillator 400, a ramp generator 403, a nonlinear ramp converter 406 and a nonlinear ramp 409. The oscillator 400 converts DC voltage into pulsed DC signal of various frequencies to control the ramp generator 403. The ramp generator generates a linear ramp supplying to the nonlinear ramp converter 406 to convert to a nonlinear ramp 409, according to various circuits design within it. Please note that it is also practicable in another embodiment if the nonlinear ramp is generated directly by a single oscillator. Similar to FIG. 4, FIG. 5 is also a block diagram of nonlinear ramp generator but further shows circuits of the ramp generator 503. An oscillator 500 generates a pulsed DC voltage to control a switch $S_1$ to open or close; it is grounded while it is opened and it is electrically conducted to a capacitor C4 and several current sources ($I_{osc}$, $I_{osc1}$, $I_{osc2}$ . . . $I_{oscn}$) while it is closed. Where the capacitor $C_4$ is also grounded, the $I_{osc}$ connecting to power supply VDD, the current source $I_{osc1}$ connecting to a switch SC1, the current source $I_{osc2}$ connecting to a switch SC2 . . . and the current source $I_{oscn}$ is connected to a switch SCN. The output terminal of an error amplifier 5031 is connected to the gate of a transistor $M_3$, whose source is connected to its negative terminal, and is also connected to a grounded resistor $R_5$. The drain of the transistor $M_3$ is connected to the drain and gate of a transistor $M_4$, and is also connected to the gate of a transistor $M_5$, where the gate of the transistor $M_4$ and the gate of the transistor $M_5$ is electrically conducted, and both two sources of the transistor $M_4$ and the transistor $M_5$ are connected to power supply VDD. Thus, the ramp generator 503 generates a ramp voltage, transferring to a nonlinear ramp converter 506 via the drain of the transistor $M_5$. Each of currents $I_{osc1}$-$I_{oscn}$ has individual switch SC1-SCN to control the current open or close according to the voltage value of a node $node_1$, consequently a different voltage value will feed the error amplifier 5031, and the charging of the capacitor $C_4$ implemented via the currents $I_{osc}$ and $I_{osc1}$-$I_{oscn}$ is affected. The error amplifier 5031 compares the voltage fed in positive terminal and the feedback voltage fed in negative terminal from the source of the transistor $M_3$, according to the result a signal is generated to even the voltage of two nodes $node_1$ and $node_2$, and the voltage of the node $node_2$ is converted to current via the resistor $R_5$, then transferring to the nonlinear ramp converter 506 via a current mirror consists of the transistor $M_4$ and the transistor $M_5$.

The form of the nonlinear ramp depends on the circuits design within the nonlinear ramp converter 506. For example, with a log amplifier and neglecting the current sources $I_{osc1}$-$I_{oscn}$ and their switch SC1-SCN, a linear ramp will be converted to a log ramp. For another instance, a resistor R6 is added between the node $node_1$ and the power supply VDD, with neglecting the current sources $I_{osc}$, $I_{osc1}$-$I_{oscn}$ and their switch SCI-SCN, transistors $M_3$, $M_4$, $M_5$ and resistor $R_5$, a linear ramp from node $node_1$ will be converted to exponential ramp, where the resistor R6 is a equivalent nonlinear ramp converter. In addition, it is known that a linear ramp could converted into multi-piecewise-linear ramp by neglecting the error amplifier 5031, the transistors $M_3$, $M_4$, $M_5$, the resistor $R_5$ and the nonlinear ramp converter 506, as well as by controlling the switches SC1-SCN to fully open or fully close, or to control some of them are open and the rest are close. Moreover, neglecting the current sources $I_{osc1}$-$I_{oscn}$ and their switches and adding a plurality of integrators could generate a power ramp.

Figure 6:
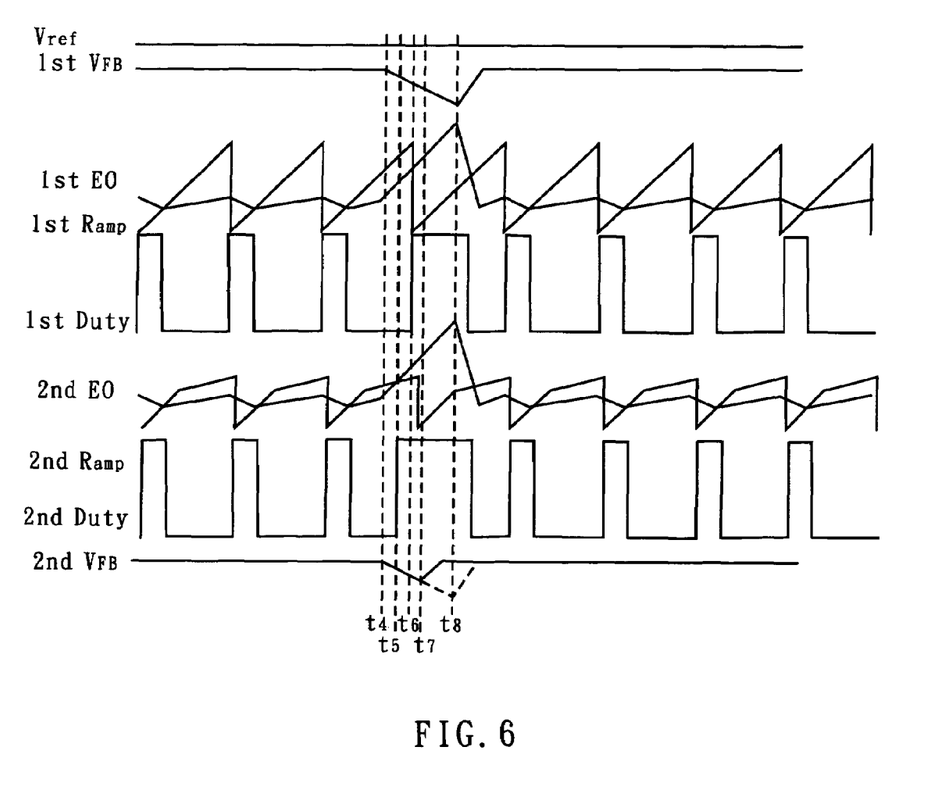
FIG. 6 is a time vs. performance diagram based on the PWM control system of one embodiment according to present invention.

FIG. 6 is a time vs. performance curve showing the comparison between the conventional PWM control system and the PWM control system according to present invention. Where the prefix "first" denote the signals of the conventional PWM control system, and the prefix "second" denote the signals the PWM control system according to present invention. At time $t_4$, the dropping of the input voltage $V_{in}$ or the output voltage $V_{out}$ causes the dropping of the first/second feedback voltage, and the first/second error output is rising in the meanwhile since the deviation departing from the target i.e. the reference voltage $V_{ref}$ is getting large. At time $t_5$, the error output is larger than the second nonlinear ramp voltage to switch the second duty signal fully on, thus to switch the transistor $M_1$ (see FIG. 3) on and to switch the transistor $M_2$ off via the gate driver 309, hence the output voltage is corrected via the inductor L and capacitor $C_{out}$ (see FIG. 3). After that, the deviation between the reference voltage $V_{ref}$ and the output voltage $V_{out}$ is beginning to close. At time $t_7$, the output voltage $V_{out}$ is high enough closing to the reference voltage, thus the second feedback voltage is beginning to rise to the steady value. However, the conventional PWM control system start to correct the output voltage $V_{out}$ at time $t_6$, and begin to back to the steady state at time $t_8$. Compared with the conventional system, the PWM control system according to present invention has better transient response with a time difference $t_8$-$t_7$.

In additional, the nonlinear ramp voltage according to present invention is a function even a proportion of input voltage $V_{in}$, thus both the loop gain of the system and the modulation gain of PWM controller will keep constant regardless of the variance of the input voltage $V_{in}$ or the duty signal, therefore a better stability could be achieved.

Figure 7:
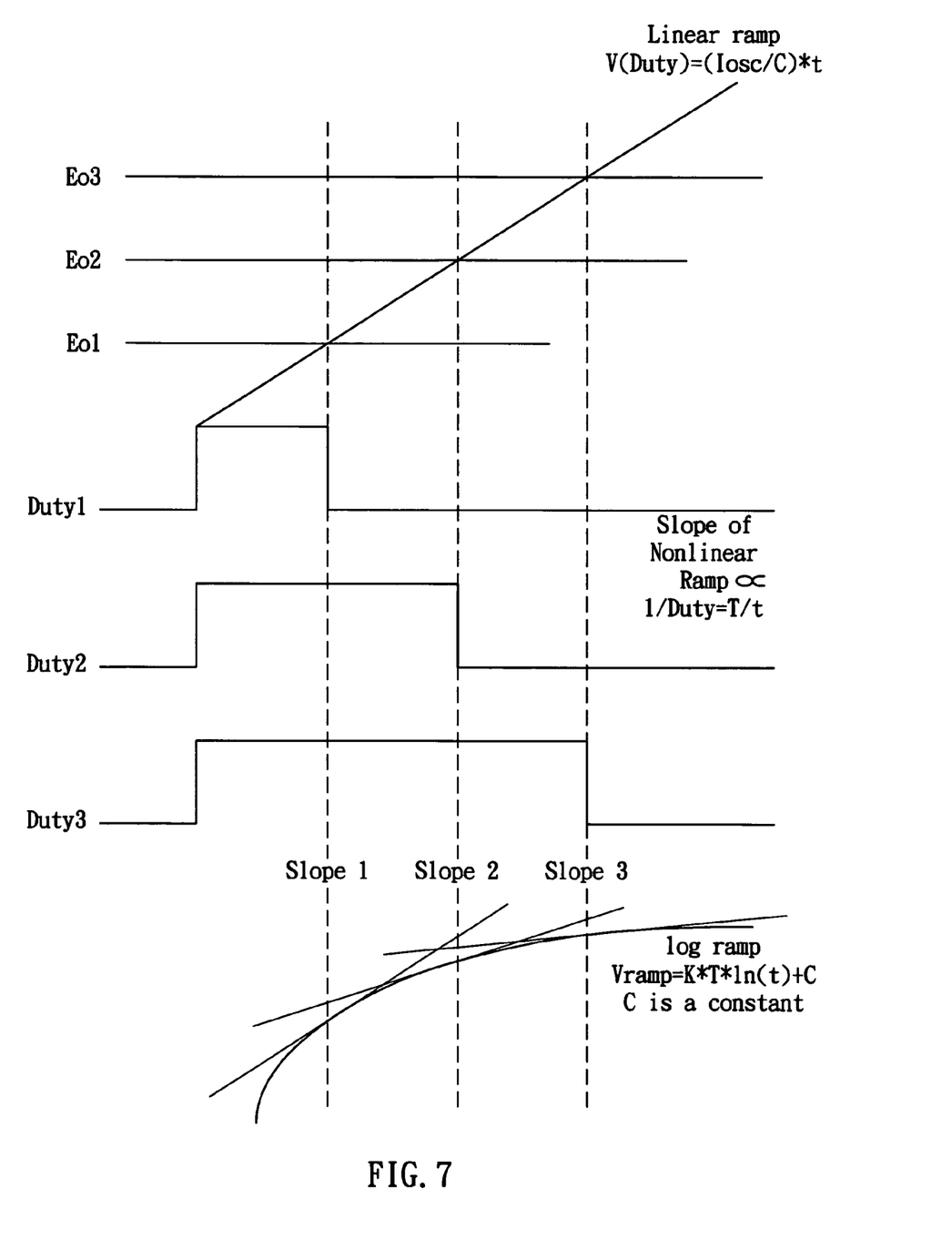
FIG. 7 illustrates a log ramp with a slope that is inverted proportional to duty and compare to the linear ramp.

With regarding to FIG. 5 and FIG. 7, we will prove both the loop gain and modulation gain is a constant as follows:

The time is a function of switching period:

$$t = D*T \tag{1}$$

where t: time; T: switching period; D=Duty=$V_{out}/V_{in}$;

the voltage of node1 can be shown that is a function of D:

$$V_{node1} = (I_{osc}/C_4)*t = (I_{osc}/C_4)*D*T = V(\text{Duty}) \tag{2}$$

where t is substituted by equation (1);

M3 evens the voltage of node1 and node2, converting to current via the resistor R5 and transferring to the nonlinear ramp converter 506 via a current mirror consists of the $M_4$ and $M_5$:

$$Id(M4)=Id(M5)=V(\text{Duty})/R_5=(I_{osc}/R_5C_4)*t=(I_{osc}/R_5C_4)(V_{out}/V_{in})T \quad (3)$$

The nonlinear ramp converter 506 is designed to let the slope of the ramp=$dV_{ramp}/dt$ is proportional to $(R_5C_4/I_{osc})/t$:

$$dV_{ramp}=K*[(R_5C_4/I_{osc})/t]dt \quad (4)$$

where K is a constant, thus the slope of the $V_{ramp}$ is (K/t) $*(R_5C_4/I_{osc})$ varying with 1/t;

at specific D, the corresponding value of $V_{ramp}$ is the slope of $V_{ramp}$ multiplied by T:

$$\begin{aligned}V_{ramp} &= (K/t)*(R_5C_4/I_{osc})*T \\ &= [K/(D*T)]*(R_5C_4/I_{osc})*T \\ &= K/D*(R_5C_4/I_{osc}) \\ &= K*(V_{in}/V_{out})*(R_5C_4/I_{osc})\end{aligned} \quad (5)$$

where D is substituted by $V_{out}/V_{in}$;

The modulation gain is $V_{in}/V_{ramp}$ and replaces $V_{ramp}$ by equation (5):

$$\text{modulation gain}=V_{in}/V_{ramp}=V_{out}/K*(I_{osc}/R_5C_4) \quad (6)$$

And the loop gain is proportional to:

$$\text{loop gain} \propto (V_{in}/V_{ramp})*(V_{ref}/V_{out})=V_{ref}/K*(I_{osc}/R_5C_4) \quad (7)$$

where $V_{ramp}$ is substituted by equation (5);

In addition, integration of both sides of equal sign of equation (4) gets:

$$V\text{ramp}=K*(R_5C_4/I_{osc})*ln(t)+C \quad (8)$$

where C is a constant, and this is the equation of the log ramp.

According to equation (6), if $V_{out}$ is a constant, modulation gain will be a constant; according to equation (7), loop gain is a constant independent of input and output voltage.

Alternatively, the same result can be analyzed by: As shown in FIG. 7, the lower the error output ($E_{o1}$, $E_{o2}$, $E_{o3}$) of the error amplifier, the lower the Duty D generates but the higher the modulation gain gets. Therefore, in order to get a constant modulation gain, it is necessary to convert the linear ramp into nonlinear ramp, and the method is letting the slope of the nonlinear ramp being inverse proportion to Duty D, $$dV_{ramp}/dt=K/D=K*T/t \quad (9)$$

where K is a constant, and D is substituted by t/T;

In addition, integration of both sides of equal sign of equation (9) gets:

$$V_{ramp}=KT*ln(t)+C \quad (10)$$

At specific D, the corresponding value of $V_{ramp}$ is the slope of $V_{ramp}$ multiplied by T:

$$V_{ramp}=(K*T/t)*T=[K*T/(D*T)]*T=K*T*V_{in}/V_{out} \quad (11)$$

and modulation gain is:

$$\text{modulation gain}=V_{in}/V_{ramp}=V_{out}/(K*T) \quad (12)$$

where $V_{ramp}$ is substituted by equation (11); and loop gain is proportion to:

$$\text{loop gain} \propto (V_{in}/V_{ramp})*(V_{ref}/V_{out})=V_{ref}/(K*T) \quad (13)$$

where $V_{ramp}$ is substituted by equation (11);

According to equation (11), if the output voltage is a constant, the modulation gain will be a constant; according to equation (13), the loop gain is also a constant; therefore the proof is completed.

While the invention has been described in conjunction with a specific mode, a number of variations may be made according to present invention. Therefore, it will be appreciated by those skilled in the art that various modifications, alternatives and variations may be made without departing from the scope of the present invention, which intended to be limited solely by the appended claims.

What is claimed is:

1. A pulse-width-modulated DC-DC converter, comprising:
   a comparison module to receive a first signal and a second signal;
   a pulse-width-modulation module comprising a pulse-width-modulation controller and a nonlinear ramp generator to receive a compared result from said comparison module and generate a duty signal, wherein said nonlinear ramp generator receives an input voltage and generates a nonlinear ramp voltage, and said nonlinear ramp voltage is a function even a proportion of said input voltage;
   a gate driver to receive a modulated signal from said pulse-width-modulation module; and
   a feedback circuit to receive a switching signal from said gate driver;
   wherein said pulse-width-modulated DC-DC converter keeps a constant loop gain.

2. The DC-DC converter as set forth in claim 1, wherein said first signal is a DC voltage source to supply a DC voltage as a reference of said comparison module.

3. The DC-DC converter as set forth in claim 1, wherein said second signal is a feedback voltage supplied by said feedback circuit to compare with said first signal via said comparison module.

4. The DC-DC converter as set forth in claim 1, wherein said nonlinear ramp generator comprises:
   an oscillator to generate a pulsed DC signal;
   a ramp generator to receive said pulsed DC signal and generate a ramp voltage; and
   a nonlinear ramp converter to receive said ramp voltage and generate a nonlinear ramp.

5. The DC-DC converter as set forth in claim 1, wherein said nonlinear ramp generator comprises an oscillator to generate a nonlinear ramp.

6. The DC-DC converter as set forth in claim 4, wherein said ramp generator comprises:
   a switch grounded its first end to open or close according to said pulsed DC signal;
   a first capacitor grounded its first end to electrically connect its second end with the second end of said switch;
   a current source to electrically connect its first end with the second end of said first capacitor and the second end of said switch, and to electrically connect its second end with a power source;
   an error amplifier to electrically connect its positive terminal with the first end of said current source;
   a first transistor to electrically connect its gate with the output of said error amplifier;
   a second transistor to electrically connect its drain with the drain of said first transistor, and to electrically connect its source to said power source, and to electrically connect its gate with its drain;

a third transistor to electrically connect its gate with the gate of said second transistor, to electrically connect its source with said power source; and a first resistor grounded its second end to electrically connect its first end with the source of said first transistor and the negative terminal of said error amplifier.

7. The DC-DC converter as set forth in claim 4, wherein said ramp generator comprises:

a switch grounded its first end to open or close according to said pulsed DC signal;

a first capacitor grounded its first end to electrically connect its second end with the second end of said switch; and a first resistor to electrically connect its first end with the second end of said first capacitor and the second end of said switch, to electrically connect its second end with a power source.

8. The DC-DC converter as set forth in claim 4, wherein said ramp generator comprises:

a switch grounded its first end to open or close according to said pulsed DC signal;

a first capacitor grounded its first end to electrically connect its second end with a second end of said switch;

a current source to electrically connect its first end with the second end of said first capacitor and the second end of said switch, and to electrically connect its second end with a power source; and a current sources module to electrically connect its first end with the second end of said first capacitor, to connect a second end of the current source module with the first end of a switches module whose second end connects to said power source.

9. The DC-DC converter as set forth in claim 4, wherein said nonlinear ramp is selected from the group consisting of log ramp, exponential ramp, multi-piecewise-linear ramp, power ramp, and combination thereof.

10. The DC-DC converter as set forth in claim 4, wherein said nonlinear ramp converter is selected from the group consisting of resistor, current source, log amplifier, capacitor, integrator, amplifier, and combination thereof.

11. A pulse-width-modulation control system with nonlinear ramp, comprising:

a compensative circuit to receive an output voltage to generate a feedback voltage;

an error amplifier circuit to receive a reference voltage and said feedback voltage to generate a error output;

a nonlinear ramp generator to receive an input voltage and to generate a nonlinear ramp, wherein said nonlinear ramp is a function even a proportion of said input voltage;

a pulse-width-modulation controller to receive said error output and said nonlinear ramp to generate a duty signal;

a gate driver to receive said duty signal to generate a first control signal and a second control signal;

a first transistor to receive a input voltage and said first control signal;

a second transistor to receive said second control signal; and a feedback circuit to generate said output voltage;

wherein said pulse-width-modulation control system keeps a constant loop gain.

12. The pulse-width-modulation control system as set forth in claim 11, wherein said compensative circuits comprises a first capacitor, a second capacitor, a third capacitor, a first resistor, a second resistor, a third resistor and a fourth resistor.

13. The pulse-width-modulation control system as set forth in claim 11, wherein said nonlinear ramp generator comprises:

a oscillator to generate a pulsed DC signal;

a ramp generator to receive said pulsed DC signal to generate a ramp voltage; and a nonlinear ramp converter to receive said ramp voltage to generate said nonlinear ramp.

14. The pulse-width-modulation control system as set forth in claim 11, wherein said nonlinear ramp generator comprises an oscillator to generate said nonlinear ramp.

15. The pulse-width-modulation control system as set forth in claim 13, wherein said ramp generator comprises:

a switch grounded its first end to open or close according to said pulsed DC signal;

a fourth capacitor grounded its first end to electrically connect its second end with a second end of said switch;

a current source to electrically connect its first end with the second end of said fourth capacitor and the second end of said switch, and to electrically connect its second end with a power source;

an error amplifier to electrically connect its positive terminal with the first end of said current source;

a third transistor to electrically connect its gate with the output of said error amplifier;

a fourth transistor to electrically connect its drain with the drain of said third transistor, and to electrically connect its source to said power source, and to electrically connect its gate with its drain;

a fifth transistor to electrically connect its gate with the gate of said fourth transistor, to electrically connect its source with said power source; and a fifth resistor grounded its second end to electrically connect its first end with the source of said third transistor and the negative terminal of said error amplifier.

16. The pulse-width-modulation control system as set forth in claim 13, wherein said ramp generator comprises:

a switch grounded its first end to open or close according to said pulsed DC signal;

a fourth capacitor grounded its first end to electrically connect its second end with a second end of said switch; and a fifth resistor to electrically connect its first end with the second end of said fourth capacitor and the second end of said switch, to electrically connect its second end with a power source.

17. The pulse-width-modulation control system as set forth in claim 13, wherein said ramp generator comprises:

a switch grounded its first end to open or close according to said pulsed DC signal;

a fourth capacitor grounded its first end to electrically connect its second end with the second end of said switch;

a current source to electrically connect its first end with the second end of said fourth capacitor and the second end of said switch, and to electrically connect its second end with a power source; and a current sources module to electrically connect its first end with the second end of said fourth capacitor and the second of said switch, to connect its second end with the first end of a switches module whose second end connects to said power source.

18. The pulse-width-modulation control system as set forth in claim 11, wherein said nonlinear ramp is selected from the group consisting of log ramp, exponential ramp, multi-piecewise-linear ramp, power ramp, and combination thereof.

19. The pulse-width-modulation control system as set forth in claim 11, wherein said nonlinear ramp converter is selected from the group consisting of resistor, current source, log amplifier, capacitor, integrator, amplifier, and combination thereof.

20. A pulse-width-modulation control system with nonlinear ramp, comprising:
an error amplifier circuits to receive a reference voltage and a feedback voltage to generate an error output;
a nonlinear ramp generator to receive an input voltage and to generate a nonlinear ramp, wherein said nonlinear ramp is a function even a proportion of said input voltage;
a pulse-width-modulation controller to receive said error output and said nonlinear ramp to generate a duty signal;
a gate driver to receive said duty signal to generate a first control signal and a second control signal;
a first transistor to receive a input voltage and said first control signal;
a second transistor to receive said second control signal; and
a feedback circuits to generate a output voltage and said feedback voltage;
wherein said pulse-width-modulation control system keeps a constant loop gain.

21. The pulse-width-modulation control system as set forth in claim 20, wherein said nonlinear ramp generator comprises a pulsed DC signal, a ramp generator to receive said pulsed DC signal to generate a ramp voltage, and a nonlinear ramp converter to receive said ramp voltage to generate said nonlinear ramp.

22. The pulse-width-modulation control system as set forth in claim 20, wherein said nonlinear ramp generator comprises an oscillator to generate said nonlinear ramp.

23. The pulse-width-modulation control system as set forth in claim 20, wherein said nonlinear ramp has at least two slopes.

24. The pulse-width-modulation control system as set forth in claim 20, wherein the slopes of said nonlinear ramp is a monotonic decreasing function.

25. The pulse-width-modulation control system as set forth in claim 20, wherein the slopes of said nonlinear ramp is a monotonic increasing function.

26. The pulse-width-modulation control system as set forth in claim 20, wherein said nonlinear ramp is selected from the group consisting of log ramp, exponential ramp, multi-piece-wise-linear ramp, power ramp, and combination thereof.

27. The pulse-width-modulation control system as set forth in claim 20, wherein said pulse-width-modulation controller keeps a constant modulation gain.

28. The DC-DC converter as set forth in claim 6, wherein said ramp generator comprises a second resistor having a first end electrically connected to said current source, and a second end electrically connected to the second end of said switch and the second end of said first capacitor.

* * * * *